(12) United States Patent
Shibasaki et al.

(10) Patent No.: US 7,595,852 B2
(45) Date of Patent: Sep. 29, 2009

(54) LIQUID CRYSTAL DISPLAY DEVICE

(75) Inventors: Masakazu Shibasaki, Mie (JP);
Hidefumi Yoshida, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 340 days.

(21) Appl. No.: 11/362,370

(22) Filed: Feb. 27, 2006

(65) Prior Publication Data

US 2006/0238685 A1    Oct. 26, 2006

(30) Foreign Application Priority Data

Mar. 4, 2005    (JP)    ............................. 2005-060220

(51) Int. Cl.
*G02F 1/1335* (2006.01)
(52) U.S. Cl. ...................... 349/117; 349/119
(58) Field of Classification Search ................. 349/117, 349/118, 119, 129
See application file for complete search history.

(56) References Cited

U.S. PATENT DOCUMENTS 5,589,963 A * 12/1996 Gunning et al. ............. 349/119
5,784,139 A * 7/1998 Chigrinov et al. ........... 349/117
5,818,615 A   10/1998 Abileah et al.
2004/0165129 A1* 8/2004 Okumura ..................... 349/114
2005/0142464 A1* 6/2005 Moriya ........................... 430/7

FOREIGN PATENT DOCUMENTS

JP    10-62623       3/1998
JP    2001-318371   11/2001

* cited by examiner

*Primary Examiner*—Michael H Caley
(74) *Attorney, Agent, or Firm*—Nixon & Vanderhye P.C.

(57) ABSTRACT

A liquid crystal panel includes a TFT substrate, an opposite substrate and a liquid crystal layer formed of a liquid crystal, which is filled in a space between the TFT and the opposite substrates, and has a negative dielectric anisotropy. A quarter wave plate and a polarizer are arranged on a front surface of the liquid crystal panel, and a quarter wave plate and a polarizer are arranged on a back surface thereof. An optical compensation layer is formed on a surface of the opposite substrate facing the liquid crystal layer. The optical compensation layer is divided into a plurality of regions for each picture element, and the respective regions are made of polymer films, each having a different compensation capability $R_{th}$ in a thickness direction.

9 Claims, 8 Drawing Sheets

$R_{LC}$ = 340nm
$R_{th}$ = 0nm $R_{LC}$ = 340nm
$R_{th}$ = 80nm $R_{LC}$ = 340nm
$R_{th}$ = 120nm $R_{LC}$ = 340nm
$R_{th}$ = 160nm $R_{LC}$ = 340nm
$R_{th}$ = 200nm $R_{LC}$ = 340nm
$R_{th}$ = 240nm

LIQUID CRYSTAL DISPLAY DEVICE

CROSS-REFERENCE TO RELATED APPLICATION

This application is based on and claims priority of Japanese Patent Application No. 2005-60220 filed on Mar. 4, 2005 the entire contents of which are incorporated herein by reference.

BACKGROUND OF THE INVENTION

1. Field of the Invention

The present invention relates to an MVA (Multi-domain Vertical Alignment) mode liquid crystal display device, and particularly to a liquid crystal display device in which a quarter wave plate is placed between a liquid crystal panel and a polarizer.

2. Description of the Prior Art

In general, a liquid crystal display device is composed of a liquid crystal panel, in which a liquid crystal is filled in a space between two substrates, and polarizers respectively placed on each of both sides of the liquid crystal panel. A picture element electrode is formed on one substrate of the liquid crystal panel for each picture element, and a common electrode common to each picture element is formed on the other substrate. When a voltage is applied between the picture element electrode and the common electrode, an alignment direction of liquid crystal molecules is changed according to the voltage, as a result, an amount of light, which passes through the liquid crystal panel and the polarizers provided on both sides thereof, is changed. The applied voltage is controlled for each picture element, thereby it is possible to display various images on the liquid crystal display device.

In a TN (Twisted Nematic) mode liquid crystal display device that has been heretofore widely used, the liquid crystal with a positive dielectric anisotropy is used and liquid crystal molecules are twist-aligned between two substrates. However, in the TN mode liquid crystal display device, there is a drawback in which a viewing angle characteristic is insufficient, gradation and contrast are considerably deteriorated, and in an extreme case, displayed images are reversed when the liquid crystal panel is looked at from an oblique direction.

An MVA (Multi-domain Vertical Alignment) mode liquid crystal display device using a liquid crystal with a negative dielectric anisotropy has been known as a liquid crystal display device having an excellent viewing angle characteristic. In the general MVA mode liquid crystal display device, protrusions (alignment control protrusions), which are formed of a dielectric material and extend in an oblique direction, are formed on the common electrode, and slits (alignment control slits) in parallel with the protrusions are formed on a picture element electrode.

In the MVA mode liquid crystal display device, liquid crystal molecules are oriented in a direction perpendicular to a substrate surface in a state where no voltage is applied, and when a voltage is applied to between the picture element electrode and the common electrode, the liquid crystal molecules are inclined and oriented at an angle according to the voltage. At this time, a plurality of regions (domains) where tilting directions of liquid crystal molecules are different from one another due to the slits formed on the picture element electrode and protrusions are formed in one picture element. Accordingly, a plurality of domains where tilting directions of liquid crystal molecules are different from one another are formed in one picture element, thereby it is possible to suppress leakage light in an oblique direction and to obtain a satisfactory viewing angle characteristic. Moreover, the MVA mode liquid crystal display device has a manufacturing advantage that eliminates a process for rubbing an alignment layer.

However, in the MVA mode liquid crystal display device, there is a drawback in which light transmittance is lower and display becomes darker unless strong backlight is used as compared with the TN mode liquid crystal display device. This is caused when the inclined orientations of the liquid crystal molecules in the edge of the protrusions and slits are shifted from predetermined orientations decided by orientations of absorption axes of polarizer and analyzer (hereinafter referred to as polarizers).

In order to solve the above drawback, Japanese Patent Laid-open Publication No. 2001-318371 proposes that circular polarizers ($\lambda/4$ plates) are respectively placed between the liquid crystal panel and a polarizer of a back surface side (backlight side), and between the liquid crystal panel and a polarizer of a front surface side (light outgoing side). These two quarter wave plates are arranged in such a manner that their slow axes are orthogonal to each other and each of the slow axes makes an angle of 45° with an absorption axis of each of adjacent polarizers. As mentioned above, the quarter wave plates are respectively placed between the liquid crystal panel and the polarizer of the back surface side, and between the liquid crystal panel and the polarizer of the front surface side, so that light passing through a liquid crystal layer is converted into a circurlar polarized light. In the case of the circurlar polarized light, the influence of the inclined orientation of the liquid crystal molecules in the edge of the protrusions and slits and the influence of the inclined orientation of the liquid crystal molecules at the picture element end portions are eliminated, thereby it is possible to improve light transmittance and provide a bright liquid crystal display device.

However, in the MVA mode liquid crystal display device using the aforementioned quarter wave plates, the viewing angle characteristic is deteriorated as compared with the MVA liquid crystal display device using no quarter wave plate. For this reason, there has been proposed an MVA mode liquid crystal display device in which an optical compensation layer is placed between a quarter wave plate and a liquid crystal panel to suppress deterioration in the viewing angle characteristic. The optical compensation layer is formed to compensate for a negative retardation which a liquid crystal layer has, and there is used a polymer film in which the relationship of Nx=Ny>Nz is established when refractive indexes in an in-plane direction are Nx and Ny and a refractive index in a thickness direction is Nz.

However, sufficient improvement in the viewing angle characteristic cannot be obtained by placing only the optical compensation layer between the liquid crystal panel and the quarter wave plate, and further improvement in the viewing angle characteristic has been demanded.

SUMMARY OF THE INVENTION

An object of the present invention is to provide an MVA mode liquid crystal display device having an excellent viewing angle characteristic as compared with the conventional one.

The above-mentioned problem can be solved by a liquid crystal display device including: a liquid crystal panel formed of first and second substrates arranged opposite to each other and of a liquid crystal layer formed of liquid crystal, which is filled in a space therebetween and has a negative dielectric anisotropy; first and second polarizers arranged to sandwich the liquid crystal panel; a first quarter wave plate placed between the liquid crystal panel and the first polarizer; a second quarter wave plate placed between the liquid crystal panel and the second polarizer; and an optical compensation layer, which has a plurality of regions, each having a different compensation capability Rth in a thickness direction for each picture element and is placed between the first and second quarter wave plates.

According to the present invention, the optical compensation layer, which has a plurality of regions, each of which has a different compensation capability Rth in a thickness direction for each picture element, is placed between the first and second quarter wave plates. In the liquid crystal display device using the liquid crystal having a negative dielectric anisotropy, it is necessary to use the optical compensation layer having a positive refractive index anisotropy in order to compensate for a negative refractive index anisotropy of the liquid crystal layer. In this case, a compensation capability Rth in the thickness direction of the optical compensation layer can be defined by $Rth=((Nx+Ny)/2-Nz) \times d$ where refractive indexes in an in-plane direction are Nx and Ny and a refractive index in a thickness direction is Nz among the main refractive indexes of the optical compensation layer. In addition, d is a thickness of the optical compensation layer.

The viewing angle characteristic of the liquid crystal display device is decided by a relationship between the negative refractive index anisotropy of the liquid crystal layer and the compensation capability of the optical compensation layer. The optical compensation layer cancels the negative retardation of the liquid crystal layer. For this reason, if the optical compensation layer is placed between the first and second quarter wave plates, the effect that is given to the viewing angle characteristic of the liquid crystal display device is the same in the case where the total sum of the compensation capabilities of the optical compensation layers is constant even if the optical compensation layer is placed between the liquid crystal layer and the first quarter wave plate, between the liquid crystal layer and the second quarter wave plate, or both between the liquid crystal layer and the first quarter wave plate and between the liquid crystal layer and the second quarter wave plate. Moreover, a material such as glass showing an optical isotropy does not have an influence upon passing light. Accordingly, for example, when a pair of glass substrates are arranged to sandwich the liquid crystal layer, the effect that is given to the viewing angle characteristic of the liquid crystal display device is the same even if the optical compensation layer is placed on the inner side of the pair of glass substrates (namely, the optical compensation layer is placed adjacent to the liquid crystal layer) or on the outer side of the pair of glass substrates. When the plurality of regions, each having a different compensation capability, are formed in one picture element as described in the present invention, the entire viewing angle characteristic is one that is obtained by averaging the viewing angle characteristics of the respective regions. This improves the viewing angle characteristic of the liquid crystal display device as compared with a case where an optical compensation layer has only a single compensation capability.

In addition, Japanese Patent Laid-open No. 10-62623 describes a liquid crystal display device including an optical anisotropic film with a plurality of regions, each having a different direction of an optical axis in one picture element. However, in order to form such an optical anisotropic film, it is necessary to provide a process for performing several rubbing processes, a process for coating a solvent containing a polymer liquid crystal or a discotic-type liquid crystal, and a process for fixing an alignment direction, and therefore, there is a drawback that the manufacture of the liquid crystal display device becomes complicated.

On the other hand, in the present invention, for example, since the polymer film having a refractive index anisotropy may be formed with a thickness different for each region, there is an advantage in which the manufacture of the liquid crystal display device can be easily manufactured as compared with the liquid crystal display device described in Japanese Patent Laid-open No. 10-62623.

DESCRIPTION OF THE PREFERRED EMBODIMENT

The present invention will be explained specifically as follows.

Figure 1:
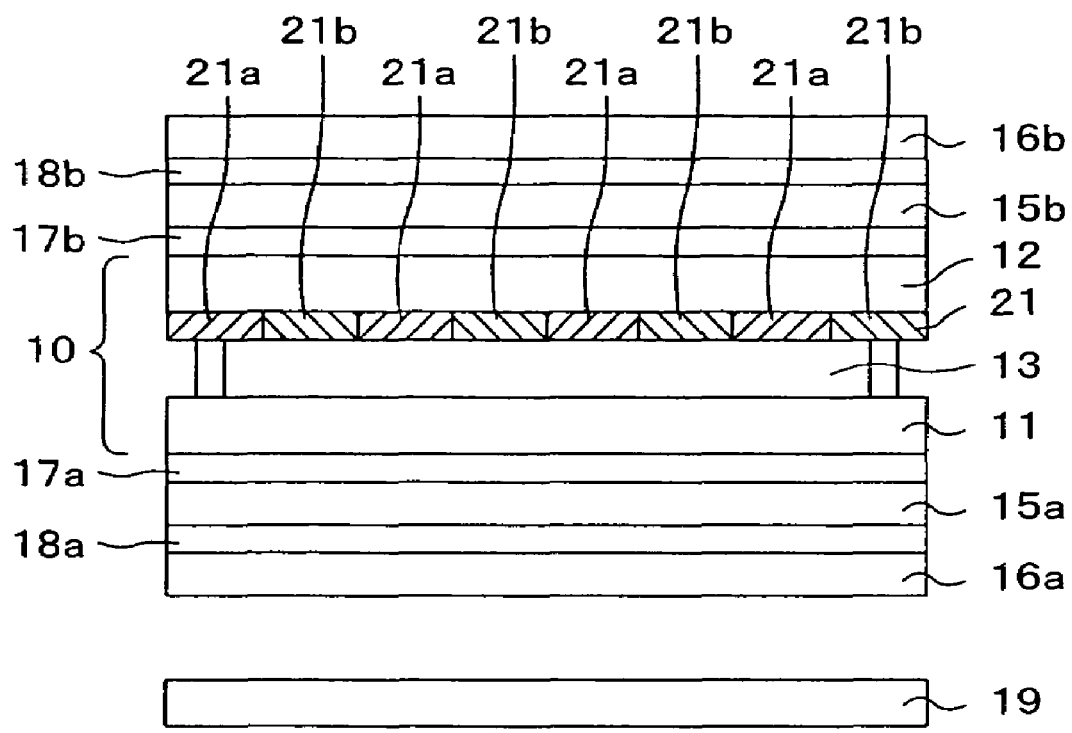
FIG. 1 is a schematic view illustrating one example of an MVA mode liquid crystal display device.

FIG. 1 is a schematic view illustrating one example of an MVA mode liquid crystal display device. The liquid crystal display device includes a liquid crystal panel 10, quarter wave plates 15a, 15b bonded to the liquid crystal panel 10, polarizers 16a, 16b, and a backlight 19 placed on a back surface side of the liquid crystal panel 10.

The liquid crystal panel 10 includes first and second substrates 11, 12, and a liquid crystal layer 13 formed of a liquid crystal, which is filled in a space between these substrates and has a negative dielectric anisotropy. A TFT (Thin Film Transistor), a picture element electrode and the like are formed on the first substrate 11, and a color filter, a common electrode and the like are formed on the second substrate 12. In this liquid crystal display device, an optical compensation layer 14 is formed on a surface of the second substrate 12 facing the liquid crystal layer 13. In two substrates that form the liquid crystal panel, a substrate on which a TFT is formed is hereinafter referred to as a TFT substrate and the other substrate placed opposite to the TFT substrate is hereinafter referred to as an opposite substrate.

A quarter wave plate 15a is bonded onto the back surface of the liquid crystal panel 10 with an adhesive 17a and a polarizer 16a is bonded onto the quarter wave plate 15a (lower side in FIG. 1) with an adhesive 18a. Moreover, a quarter wave plate 15b is bonded onto the front surface of the liquid crystal panel 10 with an adhesive 17b, and a polarizer 16b is bonded onto the quarter wave plate 15b with an adhesive 18b.

In the above-configured liquid crystal display device, by passing through the polarizer 16a, light emitted from the backlight 19 is converted into a linearly polarized light, and by further passing through the quarter wave plate 15a, the linearly polarized light is converted into a circurlar polarized light. The circurlar polarized light is converted into a linearly polarized light in passing through the quarter wave plate 15b.

By the way, since a traveling direction of light, which has passed through the quarter wave plate 15a, is changed by a negative refractive index anisotropy of the liquid crystal layer 13 in passing through the liquid crystal layer 13, the negative refractive index anisotropy of the liquid crystal layer 13 must be compensated in order to obtain a satisfactory display quality. For this reason, in the liquid crystal display device shown in FIG. 1, an optical compensation layer 14 is placed on the surface of the second substrate (opposite substrate) 12 facing the liquid crystal layer 13.

In order to compensate for the negative refractive index anisotropy of the liquid crystal layer 13, the optical compensation layer 14 must have a positive refractive index anisotropy. Namely, regarding the optical compensation layer 14, the relationship of Nx=Ny>Nz must be established when refractive indexes in an in-plane direction are Nx and Ny and the refractive index in a thickness direction is Nz. In this case, a compensation capability Rth in the thickness direction of the optical compensation layer 14 can be expressed by the following equation (1):

$$Rth=((Nx+Ny)/2-Nz) \times d \qquad (1).$$

In this case, d is a thickness of the optical compensation layer 14.

The optical compensation layer 14 preferably has equal refractive indexes (that is, Nx=Ny>Nz) in the in-plane direction. When the refractive indexes in the in-plane direction of the optical compensation layer 14 are equal to each other, light as the circurlar polarized light can pass through the optical compensation layer 14.

The relationship between the value of the compensation capability Rth in the thickness direction of the optical compensation layer 14 and retardation RLC, which the liquid crystal layer 13 has, is changed, and therefore, the viewing angle characteristic of the liquid crystal display device is changed.

A viewing angle characteristic is generally expressed by a view illustrating viewing angle to evaluate the viewing angle characteristic. FIGS. 2A to 2F are views illustrating viewing angle, each showing a result when the compensation capability Rth in the direction of the thickness of the optical compensation layer is changed. In each of FIGS. 2A to 2F, an azimuth is taken in a circumferential direction and a polar angle is taken in a concentric circular manner to illustrate iso-contrast contours. In addition, an angle, which is formed by a line obtained by projecting a sight line onto the liquid crystal panel, and an X axis (straight line extending in a right direction with the center of the liquid crystal panel as the origin) of the liquid crystal panel, is called an azimuth and an angle, which is formed by a normal line of the liquid crystal panel and the sight line, is called a polar angle. Moreover, in FIGS. 2A to 2F, a line drawn at an innermost position is an iso-contrast contour with a contrast of 100:1, and a line drawn at an outermost position is an iso-contrast contour with a contrast of 10:1.

Figure 2A:
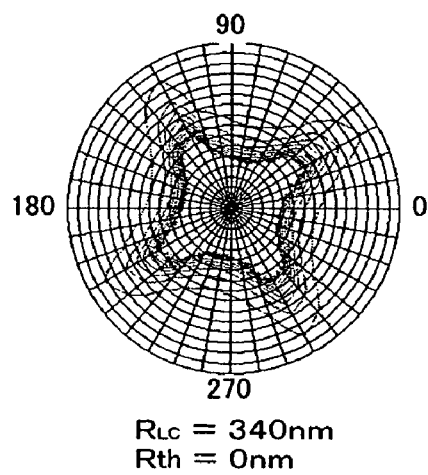
FIGS. 2A to 2F are views illustrating viewing angle, each showing a result when a compensation capability Rth in a thickness direction of an optical compensation layer is changed.
Figure 2B:
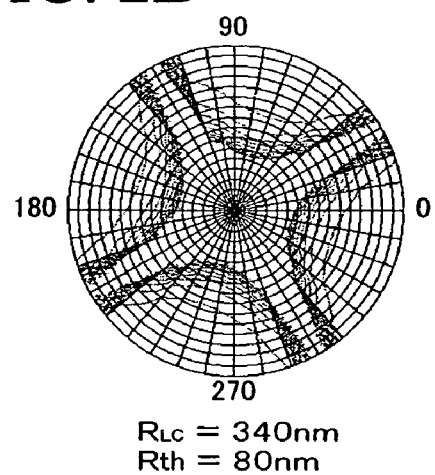
Figure 2C:
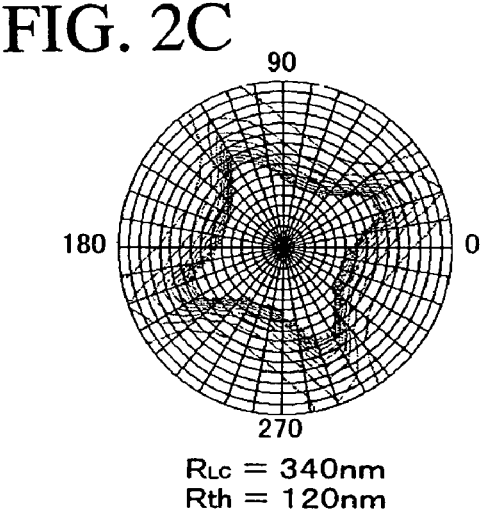
Figure 2D:
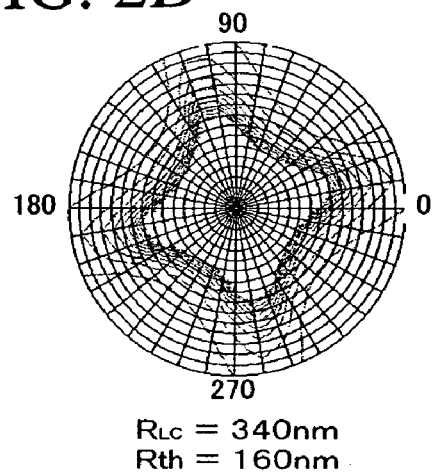
Figure 2E:
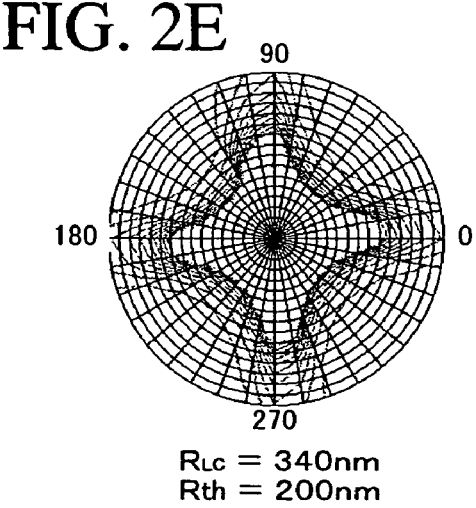
Figure 2F:
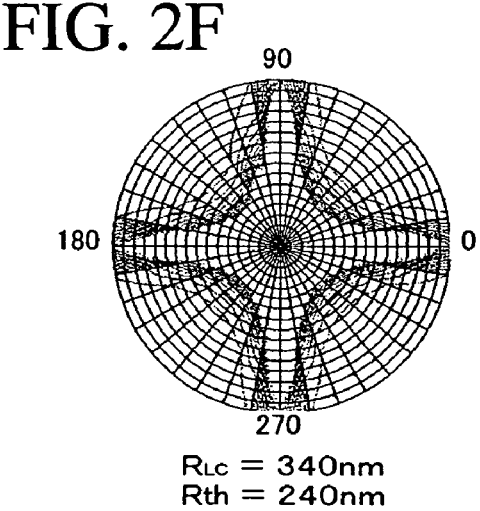

FIG. 2A is iso-contrast contours when the compensation capability Rth in the thickness direction of the optical compensation layer is 0 (Rth=0 nm); FIG. 2B is iso-contrast contours when the compensation capability Rth in the thickness direction of the optical compensation layer is 80 nm (Rth=80 nm); FIG. 2C is iso-contrast contours when the compensation capability Rth in the thickness direction of the optical compensation layer is 120 nm (Rth=120 nm); FIG. 2D is iso-contrast contours when the compensation capability Rth in the thickness direction of the optical compensation layer is 160 nm (Rth=160 nm); FIG. 2E is iso-contrast contours when the compensation capability Rth in the thickness direction of the optical compensation layer is 200 nm (Rth=200 nm); and FIG. 2F is iso-contrast contours when the compensation capability Rth in the direction of the thickness of the optical compensation layer is 240 nm (Rth=240 nm). It is noted that retardation $R_{LC}$ of the liquid crystal layer is 340 nm in any case.

As illustrated in FIGS. 2A to 2F, when the retardation $R_{LC}$ of the liquid crystal layer is constant, the iso-contrast contour is changed depending on the compensation capability Rth of the optical compensation layer. In this example, the orientation, at which the contrast is improved best, is moved in a right direction along the circumference as the compensation capability Rth of the optical compensation layer is increased. Then, when the compensation capability Rth of the optical compensation layer is 240 nm, the contrast is improved best when viewing from the direction of each of the azimuths of 0°, 90°, 180°, and 270° (i.e., the direction of each of the left, right, top and bottom).

Figure 3:
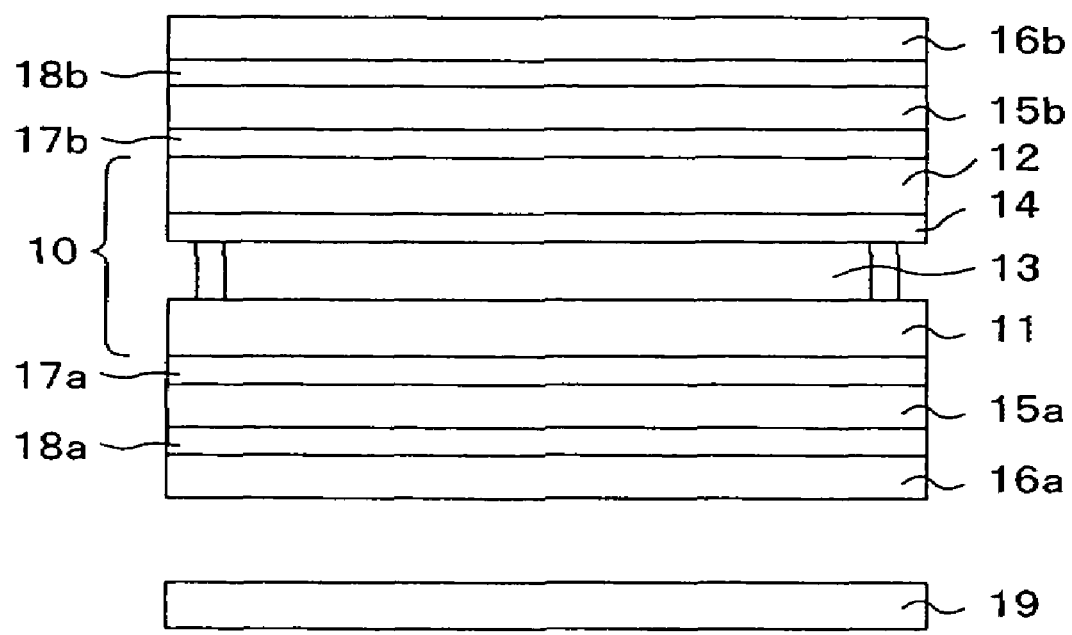
FIG. 3 is a schematic view illustrating an outline of an embodiment of the present invention.

Accordingly, in the present embodiment, as illustrated schematically in FIG. 3, one picture element is divided into a plurality of regions (two regions in FIG. 3), and polymer films 21a and 21b, each of which has a different compensation capability Rth in the thickness direction for each region, are formed to provide an optical compensation layer 21. As described above, when the plurality of polymer films, each of which has a different compensation capability Rth in the thickness direction, are formed in each region to serve as the optical compensation layer 21, the entire viewing angle characteristic is one that is obtained by averaging the viewing angle characteristics of the respective regions.

Additionally, in FIG. 3, the same elements as those in FIG. 1 are assigned the same reference numerals as in FIG. 1. Moreover, in FIG. 3, although the optical compensation layer 21 is placed on the surface of the second substrate (opposite substrate) 12 facing the liquid crystal layer 13, the optical compensation layer 21 may be placed between two quarter wave plates 15a and 15b. For example, the optical compensation layer 21 may be placed on the surface of the first substrate (TFT substrate) 11 facing the liquid crystal layer 13 and the optical compensation layer 21 may be placed between the liquid crystal panel 10 and the quarter wave plate 15a or 15b.

The embodiment of the present invention will be explained specifically as follows.

Figure 4:
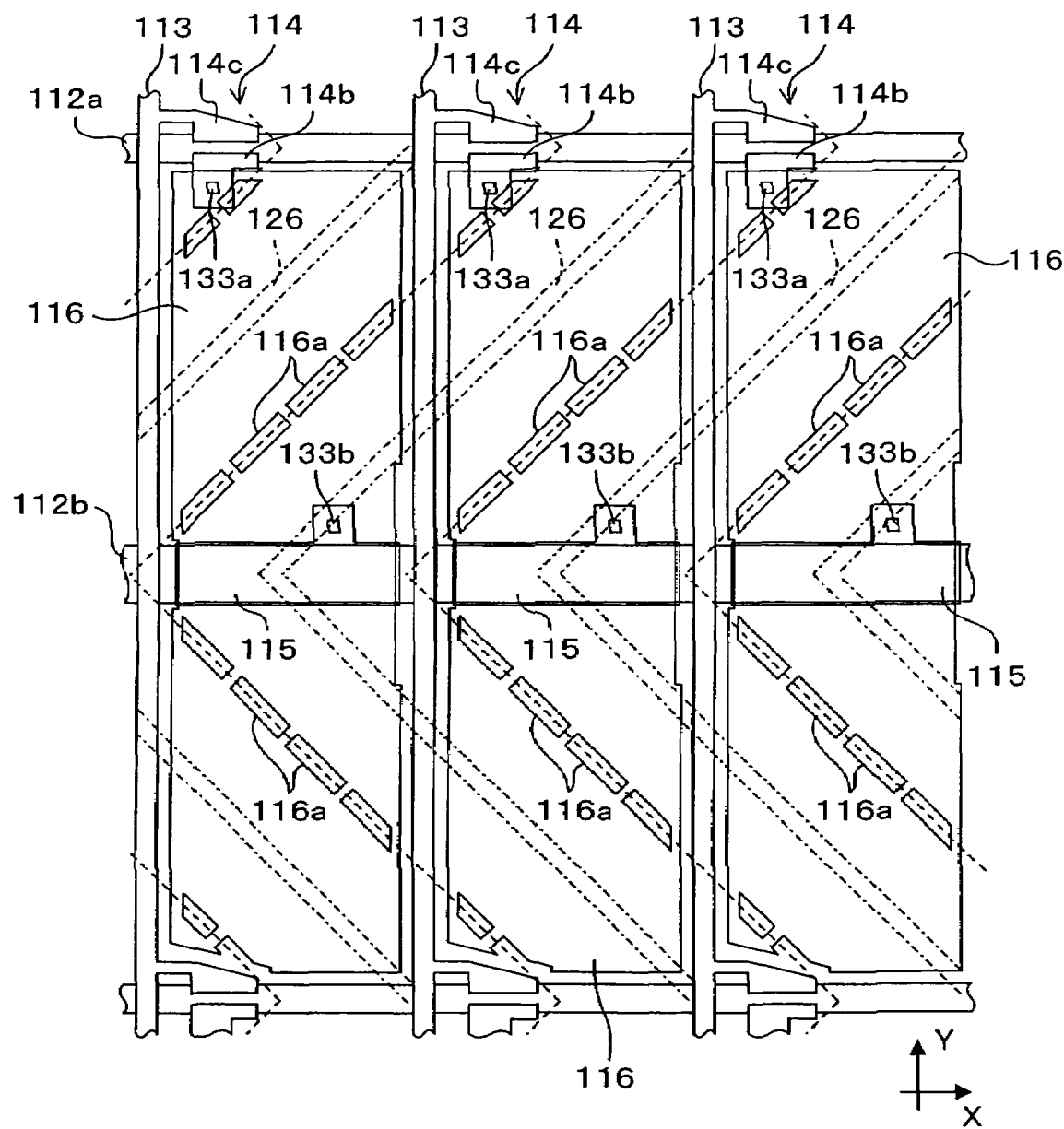
FIG. 4 is a plan view illustrating a liquid crystal display device according to the embodiment of the present invention.
Figure 5:
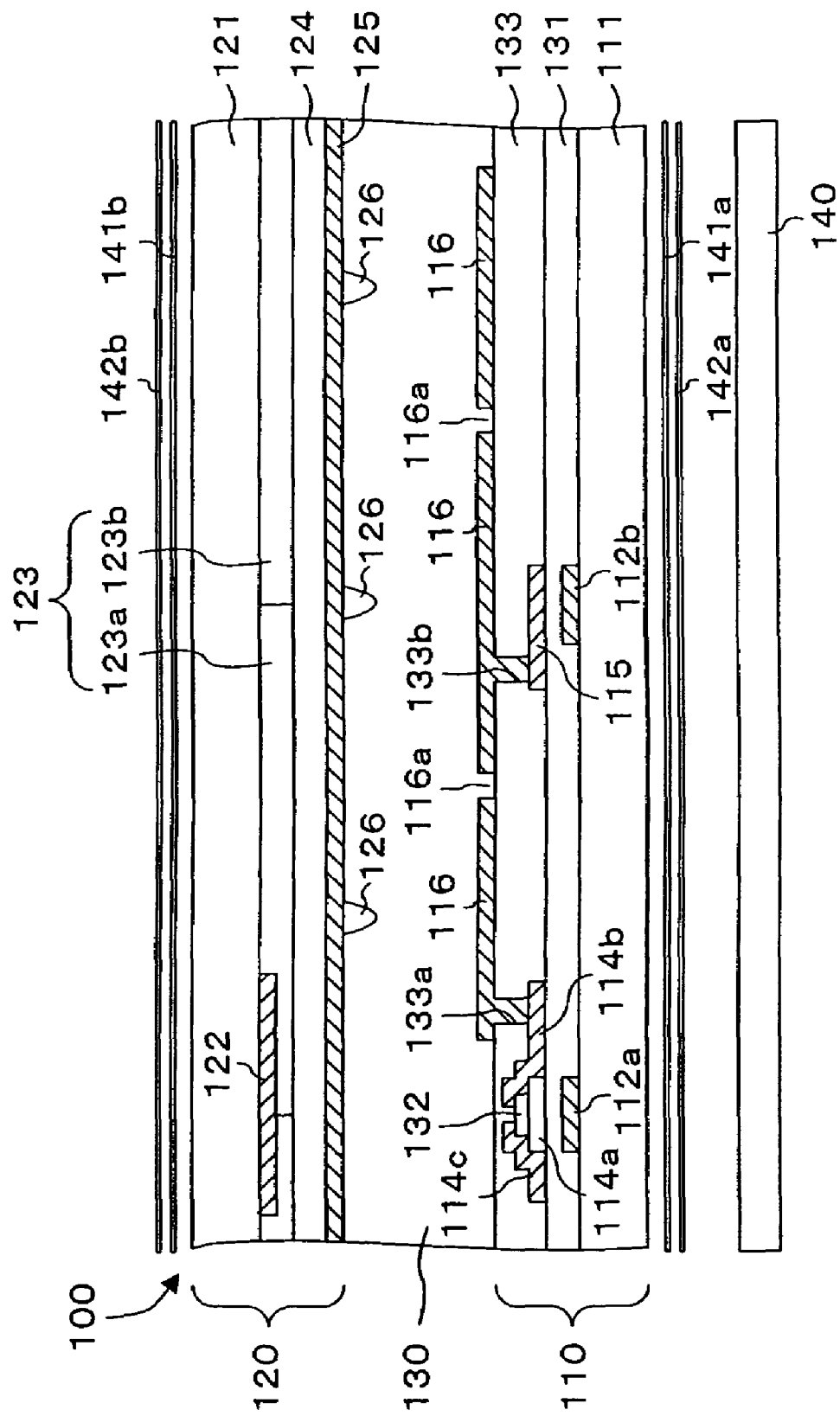
FIG. 5 is a schematic cross sectional view of the same.

FIG. 4 is a plan view illustrating a liquid crystal display device according to the embodiment of the present invention, and FIG. 5 is a schematic cross sectional view of the same. Additionally, in FIG. 4, regions for three picture elements are illustrated.

As illustrated in FIG. 5, a liquid crystal panel 100 includes a TFT substrate 110, an opposite substrate 120, and a liquid crystal layer 130 formed of a liquid crystal, which is filled in a space between these substrates 110 and 120 and has a negative dielectric anisotropy. A quarter wave plate 141a and a polarizer 142a are arranged on a back surface of the liquid crystal panel 100, and a quarter wave plate 141b and a polarizer 142b are arranged on a front surface thereof. These two polarizers 142a and 142b are arranged in such a manner that their polarizing axes are orthogonal to each other. Moreover, the quarter wave plates 141a and 141b are arranged in such a manner that their slow axes are orthogonal to each other and each of the slow axes makes an angle of 45° with an absorption axis of each of adjacent polarizers. A backlight 140 is placed on the back surface of the liquid crystal panel 100.

As illustrated in FIG. 4, on the TFT substrate 110, there are formed a plurality of gate bus lines 112a extending in a horizontal direction (X-axis direction) and a plurality of data bus lines 113 extending in a vertical direction (Y-axis direction). The gate bus lines 112a are arranged in a vertical direction at predetermined intervals (for example, about 300 μm) and the data bus lines 113 are arranged in a horizontal direction at predetermined intervals (for example, about 100 μm). Rectangular regions, which are divided by these gate bus lines 112a and data bus lines 113, are picture element regions, respectively. Furthermore, on the TFT substrate 110, an auxiliary capacitance bus line 112b is formed so as to be in parallel with the gate bus lines 112a and to cross over a central position of each picture element region.

For each picture element, a TFT 114, a picture element electrode 116 and an auxiliary capacitance electrode 115 are formed. The TFT 114 is placed in the vicinity of a crossing position of the gate bus line 112a and the data bus line 113. A drain electrode 114c of the TFT 114 is electrically connected to the data bus line 113.

The picture element electrode 116 is formed of a transparent conductive material such as ITO (indium-Tin Oxide). The picture element electrode 116 includes alignment control slits 116a along a zigzag imaginary line (shown by a broken line in the figure), which is bent on the gate bus line 112a and the auxiliary capacitance bus line 112b. Moreover, the picture element electrode 116 is electrically connected to a source electrode 114b of the TFT 114 through a contact hole 133a and is electrically connected to the auxiliary capacitance electrode 115 through a contact hole 133b.

A layered structure of each of the TFT substrate 110 and the opposite substrate 120 will be explained with reference to FIG. 5 as follows. First, the layered structure of the TFT substrate 110 will be explained.

On a glass substrate 111 serving as a base of the TFT substrate 110, the gate bus line 112a and the auxiliary capacitance bus line 112b are formed. These gate bus line 112a and the auxiliary capacitance bus line 112b are formed simultaneously by patterning, by a photolithographic method, a metal film on which for example, Al(aluminum)/Ti(titanium) are superimposed. On the glass substrate 111, there is formed a first insulating film (gate insulating film) 131 that covers these gate bus line 112a and auxiliary capacitance bus line 112b. The first insulating film 131 is formed of, for example, $SiO_2$ or SiN.

On a predetermined region of the first insulating film 131, there is formed a semiconductor film (amorphous silicon or polysilicon film) 114a serving as an active layer for the TFT 114. Moreover, on a region serving as a channel for the semiconductor film 114a, there is formed a channel protection film 132 made of SiN. A source electrode 114b and a drain electrode 114c of the TFT 114 are arranged at a position where they are opposed to each other with the channel protection film 132 interposed therebetween.

Furthermore, on the first insulating film 131, the data bus line 113 and the auxiliary capacitance electrode 115 are formed. The data bus line 113 extends in a direction orthogonal to the gate bus line 112a and is connected to the drain electrode 114c of the TFT 114 as mentioned above. Moreover, the auxiliary capacitance electrode 115 is placed at a position opposed to the auxiliary capacitance bus line 112b with the first insulating film 131 interposed therebetween. The auxiliary capacitance is formed of the auxiliary capacitance electrodes 115, the first insulating film 131, and the auxiliary capacitance bus line 112b. The data bus line 113, the source electrode 114b, the drain electrode 114c and the auxiliary capacitance electrode 115 are formed simultaneously by patterning, by the photolithographic method, a metal film on which, for example, Ti/Al/Ti/ are superimposed.

The data bus line 113, the source electrode 114b, the drain electrode 114c and the auxiliary capacitance electrode 115 are covered with a second insulating film 133 made of, for example, $SiO_2$ or SiN. Then, the picture element electrode 116, made of a transparent conductive material such as ITO, is formed on the second insulating film 133. As mentioned above, the slits (alignment control structures) 116a extending in the oblique direction are formed in the picture element electrode 116. Moreover, the picture element electrode 116 is electrically connected to the source electrode 114b through the contact hole 133a formed in the second insulating film 133 and is further electrically connected to the auxiliary capacitance electrode 115 through the contact hole 133b. The surface of the picture element electrode 116 is covered with a vertical alignment layer (not shown), which is made of, for example, polyimide.

On the other hand, the opposite substrate 120 includes a glass substrate 121 serving as a base, a black matrix 122, an optical compensation layer 123, a color filter 124, a common electrode 125, and protrusions (alignment control structures) 126. The black matrix 122 is formed of metal such as Cr (chromium) or a black resin, and is placed at a position opposite to the gate bus line 112a, the data bus line 113, and the TFT 114 of the TFT substrate 110.

The optical compensation layer 123 includes two polymer films 123a and 123b, each of which has a different compensation capability Rth in the thickness direction for each picture element. In the present embodiment, each of the polymer films 123a and 123b has the same quality of material and a different thickness. Each of the polymer films 123a and 123b may have the same thickness and a different quality of material.

The color filter 124 is formed on the optical compensation layer 123 (lower side in FIG. 5). The color filter 124 includes three kinds of red (R), green (G), and blue (B), and the color filter 124 of any one of red (R), green (G), and blue (B) is placed at the position opposite to the picture element electrode 116 of each picture element.

On the color filter 124 (lower side in FIG. 5), there is formed the common electrode 125 made of a transparent conductive material such as ITO. Then, as illustrated in FIG. 5, the protrusions 126, which are made of a dielectric material, are formed under the common electrode 125. The protrusions 126 are made of, for example, a photoresist, and are placed between lines of the slits 116a of the picture element electrode 116 as indicated by alternate long and short dash lines in FIG. 4. The surfaces of these common electrode 125 and protrusions 126 are covered with the vertical alignment layer (not shown) which is made of, for example, polyimide.

Figure 6A:
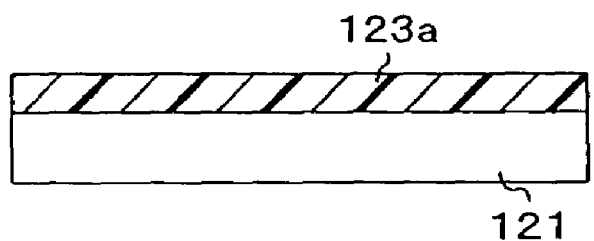
FIGS. 6A to 6E are schematic views, each showing a method of forming an optical compensation layer.
Figure 6B:
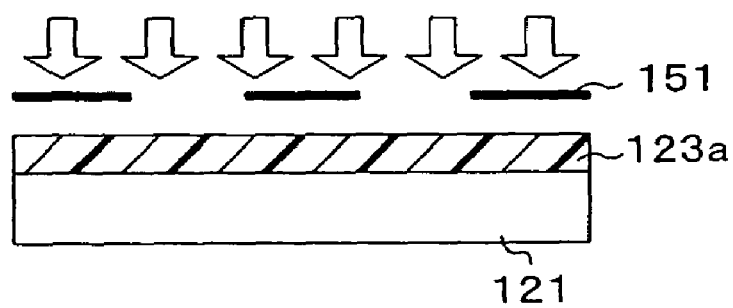
Figure 6C:
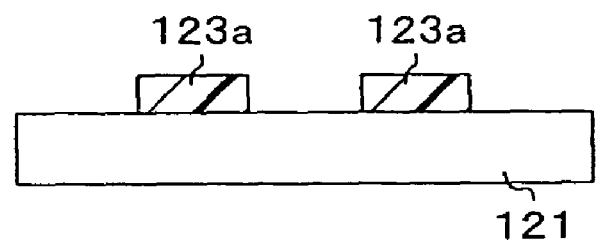

FIGS. 6A to 6E are schematic views, each showing a method of forming the optical compensation layer 123. First, as illustrated in FIG. 6A, the upper entire surface of the glass substrate 121 is coated with a photosensitive polymer film material to have a first thickness, thereby the polymer film 123a is formed. Next, as illustrated in FIG. 6B, the polymer film 123a is exposed through an exposure mask 151. After that, a developing process is performed to cause the polymer film 123a to be left in only the first region as illustrated in FIG. 6C.

Figure 6D:
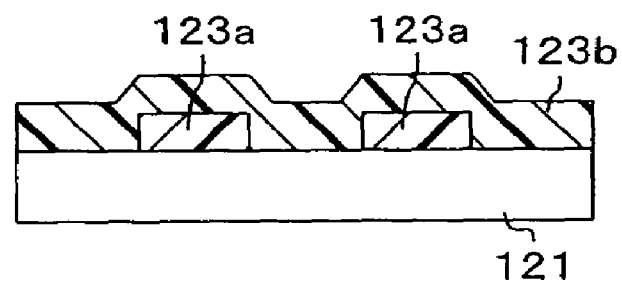
Figure 6E:
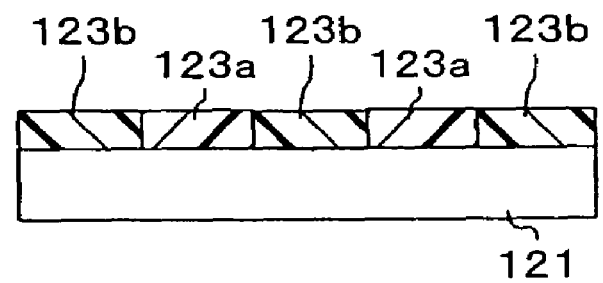

Next, as illustrated in FIG. 6D, the upper entire surface of the glass substrate 121 is coated with a photosensitive polymer film material to have a second thickness, thereby the polymer film 123b is formed. Next, the polymer film 123a is exposed through the exposure mask and thereafter a developing process is performed to cause the polymer film 123b to be left in only the second region as illustrated in FIG. 6E.

In this way, the polymer films 123a and 123b, each having a different compensation capability Rth in the thickness direction can be formed in one picture element.

An examined result of the viewing angle characteristic after actually manufacturing the liquid crystal display device of the present embodiments will be explained as follows.

EXAMPLE 1

The liquid crystal display device having the structure as illustrated in FIGS. 4 and 5 was manufactured. However, on the opposite substrate 120, there were formed the polymer films 123a and 123b as the optical compensation layer 123 where their compensation capabilities Rth in the thickness direction were 80 nm and 240 nm, respectively. An area ratio between the polymer films 123a and 123b was 1:1. Moreover, a liquid crystal having a negative dielectric anisotropy was used as a liquid crystal that forms the liquid crystal layer 130.

The quarter wave plate 141a was bonded to the back surface of the liquid crystal panel 100, and the polarizer 142a was placed on the quarter wave plate 141a (lower side in FIG. 5) with TAC (triacetyl-cellulose) interposed therebetween. Moreover, the quarter wave plate 141b was bonded to the front surface of the liquid crystal panel 100, and the polarizer 142b was placed on the quarter wave plate 141b with the TAC film interposed therebetween. The polarizers 142a and 142b were arranged that their optical absorption axes were orthogonal to each other. Moreover, the quarter wave plates 141a and 141b were arranged that their slow axes were orthogonal to each other and each of the slow axes made an angle of 45° with an absorption axis of each of adjacent polarizers. In addition, the value of retardation $R_{LC}$ of the liquid crystal layer 130 was 340 nm.

Figure 7:
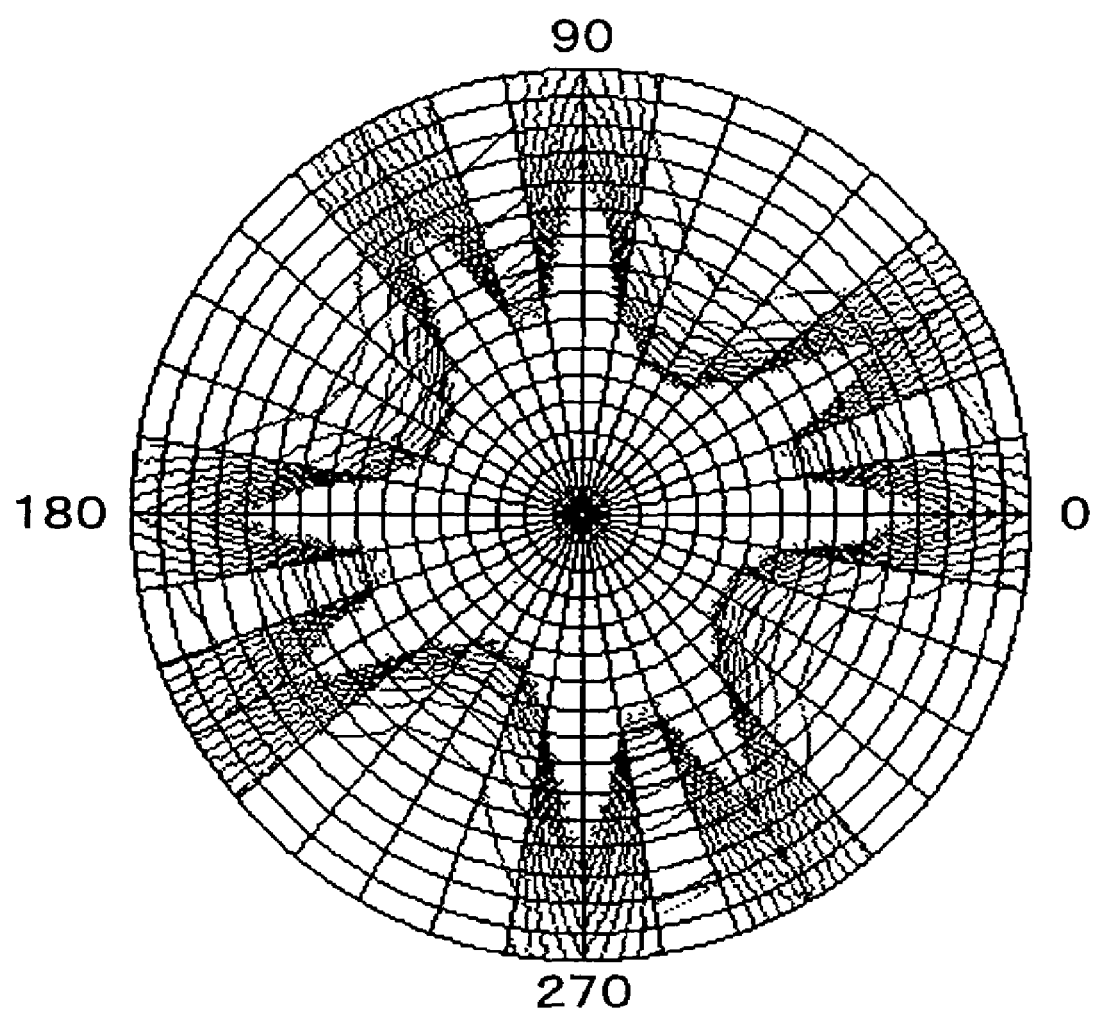
FIG. 7 is a view illustrating viewing angle of a liquid crystal display device of the embodiment (Example 1) of the present invention.

FIG. 7 is a view illustrating viewing angle of the liquid crystal display device of Example 1. In FIG. 7, a line drawn at an innermost position is an iso-contrast contour with a contrast of 100:1, and a line drawn at an outermost position is an iso-contrast contour with a contrast of 10:1. The comparison between FIG. 7 and each of FIGS. 2A to 2F shows that a range where satisfactory contrast can be obtained is wide and the viewing angle characteristic is largely improved in the liquid crystal display device of Example 1.

EXAMPLE 2

The liquid crystal display device of Example 2 was manufactured in the same way as Example 1. However, in Example 2, one picture element was divided into three regions to form polymer films as the optical compensation layer where each film has a different compensation capability in the thickness direction for each region. Namely, the polymer film with 80 nm of the compensation capability Rth in the thickness direction was formed in the first region, the polymer film with 120 nm of the compensation capability Rth in the thickness direction was formed in the second region, and the polymer film with 240 nm of the compensation capability Rth in the thickness direction was formed in the third region. In addition, an area ratio among these polymer films was 1:1:1. Moreover, the value of retardation $R_{LC}$ of the liquid crystal layer was 340 nm, which was the same as Example 1.

Figure 8:
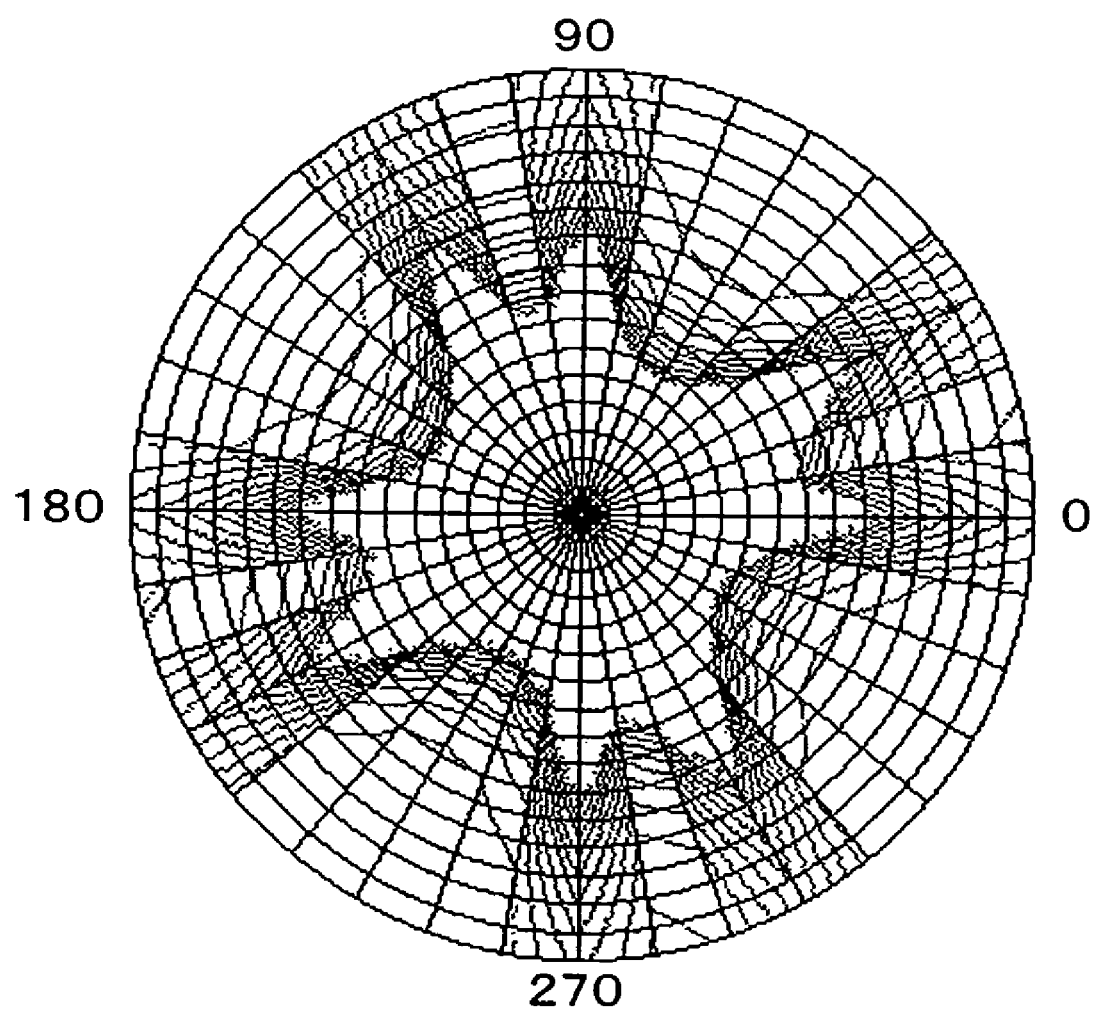
FIG. 8 is a view illustrating viewing angle of a liquid crystal display device of the embodiment (Example 2) of the present invention.

FIG. 8 is a view illustrating viewing angle of the liquid crystal display device of Example 2. In FIG. 8, a line drawn at an innermost position is an iso-contrast contour with a contrast of 100:1, and a line drawn at an outermost position is an iso-contrast contour with a contrast of 10:1. The comparison between FIG. 8 and each of FIGS. 2A to 2F shows that a range where satisfactory contrast can be obtained is wide and the viewing angle characteristic is largely improved in the liquid crystal display device of Example 2.

What is claimed is:

1. A liquid crystal display device including a plurality of picture elements, comprising:
   a liquid crystal panel including first and second substrates arranged opposite to each other and a liquid crystal layer formed of a liquid crystal, which is filled in a space between the first and the second substrates and has a negative dielectric anisotropy;
   first and second polarizers arranged with the liquid crystal panel interposed therebetween;
   a first quarter wave plate placed between the liquid crystal panel and the first polarizer;
   a second quarter wave plate placed between the liquid crystal panel and the second polarizer; a plurality of picture elements and a plurality of color filters; and
   an optical compensation layer provided between the first and second quarter wave plates, wherein the optical compensation layer includes a plurality of regions for each picture element corresponding to each color filter, wherein the regions in each picture element have different compensation capabilities Rth in a thickness direction respectively.

2. The liquid crystal display device according to claim 1, wherein the optical compensation layer is formed on a surface of any one of the first and second substrates facing the liquid crystal layer.

3. The liquid crystal display device according to claim 1, wherein the optical compensation layer is made of a plurality of polymer films, each of which has a different thickness for each region.

4. The liquid crystal display device according to claim 1, wherein the optical compensation layer is made of a plurality of polymer films, each of which has a different refractive index anisotropy for each region.

5. The liquid crystal display device according to claim 1, wherein alignment control structures are formed on at least any one of the first and second substrates for each picture element to cause alignment directions of liquid crystal molecules to point toward at least two directions in the voltage-applied state.

6. The liquid crystal display device according to claim 5, wherein the alignment control structures are protrusions made of a dielectric material.

7. The liquid crystal display device according to claim 5, wherein the alignment control structures are slits formed on an electrode.

8. The liquid crystal display device of claim 1, wherein the optical compensation layer is characterized by Nx=Ny>Nz.

9. The liquid crystal display device of claim 1, wherein an optical compensation Rth of the compensation layer in the thickness direction is substantially expressed by:

$$Rth = ((Nx+Ny)/2 - Nz) \times d$$

where "d" is a thickness of the optical compensation layer.

* * * * *

UNITED STATES PATENT AND TRADEMARK OFFICE
CERTIFICATE OF CORRECTION

PATENT NO. : 7,595,852 B2
APPLICATION NO. : 11/362370
DATED : September 29, 2009
INVENTOR(S) : Shibasaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 352 days.

Signed and Sealed this

Twenty-eighth Day of September, 2010

David J. Kappos
*Director of the United States Patent and Trademark Office*